(12) United States Patent
Gu

(10) Patent No.: US 9,332,267 B2
(45) Date of Patent: May 3, 2016

(54) METHOD AND TERMINAL FOR VIDEO ENCODING IN MULTI-PARTY VIDEO COMMUNICATION

(71) Applicant: TENCENT TECHNOLOGY (SHENZHEN) COMPANY LIMITED, Guangdong (CN)

(72) Inventor: Chenchen Gu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/378,091

(22) PCT Filed: Jan. 22, 2013

(86) PCT No.: PCT/CN2013/070833
§ 371 (c)(1),
(2) Date: Aug. 11, 2014

(87) PCT Pub. No.: WO2013/123839
PCT Pub. Date: Aug. 29, 2013

(65) Prior Publication Data
US 2015/0215627 A1 Jul. 30, 2015

(30) Foreign Application Priority Data
Feb. 22, 2012 (CN) .......................... 2012 1 0040481

(51) Int. Cl.
*H04N 19/156* (2014.01)
*H04N 7/15* (2006.01)
(Continued)

(52) U.S. Cl.
CPC ............. *H04N 19/156* (2014.11); *H04N 7/15* (2013.01); *H04N 7/152* (2013.01); *H04N 19/115* (2014.11);
(Continued)

(58) Field of Classification Search
USPC .......................................... 375/240.01–240.2
See application file for complete search history.

(56) References Cited

U.S. PATENT DOCUMENTS

| 2008/0309751 | A1  | 12/2008 | Lam et al. |           |
|--------------|-----|---------|------------|-----------|
| 2009/0033739 | A1* | 2/2009  | Sarkar     | H04N 7/152 |
|              |     |         |            | 348/14.09 |
| 2011/0090949 | A1* | 4/2011  | Gu         | H04N 7/152 |
|              |     |         |            | 375/240.01 |

FOREIGN PATENT DOCUMENTS

| CN | 1380795 A  | 11/2002 |
|----|------------|---------|
| CN | 1788494 A  | 6/2006  |

(Continued)

OTHER PUBLICATIONS

International Preliminary Report and Written Opinion of the International Searching Authority for International Application No. PCT/CN2013/070833, issued on Aug. 26, 2014, in 6 pages.

(Continued)

*Primary Examiner* — Dave Czekaj
*Assistant Examiner* — Shanika Brumfield
(74) *Attorney, Agent, or Firm* — Knobbe Martens Olson & Bear LLP

(57) ABSTRACT

According to an example, after a terminal X joins in a multi-party video communication, a number of important video encoders in use and a number of common video encoders in use of the terminal are respectively determined; according to a processing capability of the terminal and a newest determining result, an encoding parameter is respectively determined for an important video and a common video, and each important video encoder in use and each common video encoder in use are informed to perform video encoding according to the newly determined encoding parameters.

14 Claims, 3 Drawing Sheets

(51) Int. Cl.
*H04N 19/196* (2014.01)
*H04N 19/115* (2014.01)
*H04N 19/154* (2014.01)
*H04N 19/179* (2014.01)
*H04N 19/127* (2014.01)
*H04N 19/146* (2014.01)
*H04N 19/162* (2014.01)

(52) U.S. Cl.
CPC ........... *H04N 19/127* (2014.11); *H04N 19/146* (2014.11); *H04N 19/154* (2014.11); *H04N 19/179* (2014.11); *H04N 19/196* (2014.11); *H04N 19/162* (2014.11)

(56) References Cited

FOREIGN PATENT DOCUMENTS

| CN | 101365125 A | 2/2009 |
| CN | 101588252 A | 11/2009 |
| CN | 101742223 A | 6/2010 |
| WO | WO 2004/077835 A1 | 9/2004 |
| WO | WO 2006/126974 A1 | 11/2006 |

OTHER PUBLICATIONS

Extended European Search Report for European Patent Application No. 13752176.1, issued on Feb. 4, 2015, in 6 pages.

Office Action for Chinese Patent Application No. 201210040481.X, issued on Dec. 4, 2012.

Written Opinion of the International Search Authority for PCT/CN2013/070833 mailed May 2, 2013 in 4 pages (English Translation in 5 pages).

International Search Report for PCT/CN2013/070833 mailed on May 2, 2013 in 2 pages.

\* cited by examiner

METHOD AND TERMINAL FOR VIDEO ENCODING IN MULTI-PARTY VIDEO COMMUNICATION

CROSS-REFERENCE TO RELATED APPLICATIONS

This application is a U.S. National Phase application under 35 U.S.C. §371 of International Application No. PCT/CN2013/070833, filed Jan. 22, 2013, entitled "VIDEO CODING METHOD IN MULTI-PERSON VIDEO COMMUNICATIONS AND TERMINAL", the entire contents of which are incorporated herein by reference.

FIELD OF THE DISCLOSURE

The present disclosure relates to multi-party video communication techniques, and more particularly, to a method and a system for video encoding in a multi-party video communication.

BACKGROUND OF THE DISCLOSURE

With development and popularization of Internet techniques and radio communication techniques, video communications such as group video chat, video conference and network video game make negotiations between people more convenient and make entertainment manners richer. Therefore, video communications attract more and more attentions of people. The multi-party video communication refers to an instant video communication that three or more persons participate in at the same time.

In the multi-party video communication, multiple channels of video data have to be processed. In order to meet the requirement of network conditions of the multiple channels, a terminal participating in the multi-party video communication usually includes multiple video encoders. Generally, the video encoding has a high computing complexity. The computing complexity of synchronous video encoding of multiple channels is higher. Therefore, in the case that the terminal has limited processing capability, an encoding parameter of each video encoder should be configured reasonably, so as to control the computing complexity reasonably.

SUMMARY OF THE DISCLOSURE

Examples of the present disclosure provide a method for video encoding in a multi-party video communication.

The technical solution of the present disclosure is as follows.

A method for video encoding in multi-party video communication, after a terminal X joins in a multi-party video communication, the method includes:

A, respectively determining a number of important video encoders in use and a number of common video encoders in use of the terminal;

B, according to a processing capability of the terminal and a newest determining result, respectively determining an encoding parameter for an important video and an encoding parameter for a common video, and informing each important video encoder in use and each common video encoder in use to perform video encoding according to the newly determined encoding parameters.

A terminal, including one or more important video encoders, one or more common video encoders, and an adaptive adjusting module;

the adaptive adjusting module is adapted to determine, after the terminal joins in a multi-party video communication, the number of important video encoders in use and the number of common video encoders in use; and determine, according to a processing capability of the terminal and a newest determined result, an encoding parameter for an important video and an encoding parameter for a common video, and inform each important video encoder in use and each common video encoder in use to respectively perform video encoding according to the newly determined encoding parameters.

A non-transitory computer readable storage medium, including a set of instructions for video encoding in multi-party video communication, the set of instructions to direct at least one processor to perform the method provided by the present disclosure.

It can be seen from the above technical solution that, with respect to each terminal participating in the multi-party video communication, the encoding parameter of the important video and the encoding parameter of the common video are determined according to the processing capability of the terminal and the number of important video encoders in use and the number of common video encoders in use. Thus, the computing resources in the terminal can be utilized more reasonably and the overall video communication quality is increased.

BRIEF DESCRIPTION OF THE DRAWINGS

Figures used in the descriptions of the following examples or existing techniques are briefly introduced herein to make the technical solution of the present disclosure clearer. It should be noted that, the following figures are merely some examples. Those skilled in the art would get many variations according to these figures without an inventive work.

DETAILED DESCRIPTION OF THE DISCLOSURE

In a practical application, a uniform encoding parameter, e.g., a highest encoding frame rate is configured for each video encoder of each terminal according to an average processing capability or according to processing capabilities of most terminals. Each video encoder performs video encoding according to the configured uniform highest encoding frame rate and transmits encoded data out.

However, the terminal participating in the multi-party video communication may be a conventional terminal, e.g., a personal computer (PC), or may be a mobile electronic device, such as a cell phone or a palm computer. There is a big difference in processing capabilities of different types of terminals. Thus, if the uniform encoding parameter is configured for each video encoder of each terminal, a following problem may exist: for a terminal with a high processing capability, computing resources are wasted and a best video communication quality cannot be achieved. For a terminal with a poor processing capability, the video communication quality is decreased.

Whichever of the above situations emerge, the computing resources of the terminal cannot be utilized reasonably. Thus, the overall video communication quality is affected.

In order to solve the problem in the existing techniques, an example of the present disclosure provides an improved video encoding solution used in multi-party video communication.

The present disclosure is described hereinafter in further detail with reference to accompanying drawings and examples to make the technical solution and merits therein clearer.

Figure 1:
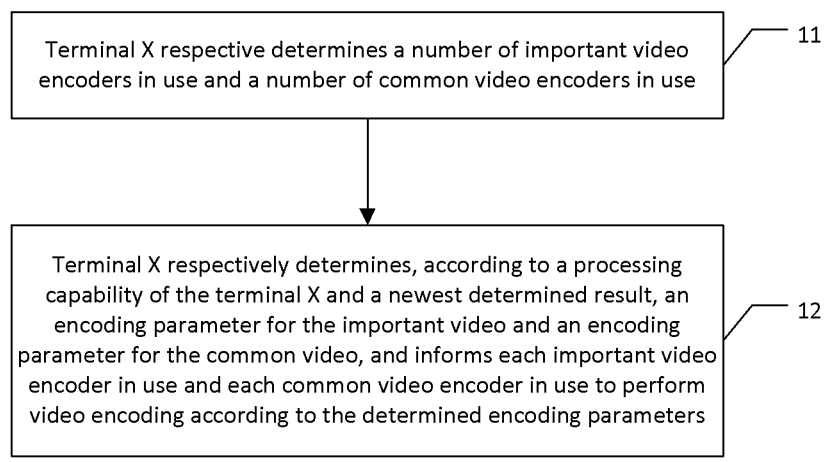
FIG. 1 is a flowchart illustrating a method for video encoding in a multi-party video communication according to an example of the present disclosure.

FIG. 1 is a flowchart illustrating a video encoding method in a multi-party video communication according to an example of the present disclosure. After a terminal X joins in the multi-party video communication, operations as shown in FIG. 1 are executed. As shown in FIG. 1, the method includes the following.

At block 11, the terminal X respectively determines the number of important video encoders in use and the number of common video encoders in use.

For facilitating the description, in the example of the present disclosure, the terminal X refers to any terminal, e.g., a personal computer (PC), a cell phone, a palmtop computer, etc.

In the example, videos are divided into important videos and common videos according to a focus degree. The important video refers to a video with a relatively high focus degree, i.e., a video that should be focused on. The common video refers to a video with a relatively low focus degree. Generally, an important video has a high resolution, whereas the common video has a low resolution. The common video or the important video may be determined through comparing its focus degree with a predefined threshold, or may be determined by a user of the terminal, or by any other manners, which is not restricted in the present disclosure.

After the terminal X joins in the multi-party video communication, a video connection needs to be established between the terminal X and each remote terminal in the multi-party video communication. The user of the terminal X may determine according to his requirement that each remote video is an important video or a common video. The user may also switch an important video to a common video during the communication, or vice versa. For example, the user may focus less on one remote video and configure it as a common video. Thereafter, the user has to focus on this video for some reasons. At this time, the user may switch it to an important video through clicking a button on a user interface. Similarly, each remote terminal participates in the multi-party video communication may also configure the video generated by the terminal X as an important video or a common video according to their requirements. Switching operation may also be performed during the communication.

In one example, the terminal X uses one video encoder for each remote terminal. In other cases, the terminal X may also use one video encoder for a plurality of remote terminals.

Thus, if there are n remote users configure the video generated by the terminal X as an important video, the terminal X requires $n_b(n_b \leq n)$ important video encoders. If m remote users configure the video generated by the terminal X as a common video, the terminal X requires $m_c(m_c \leq m)$ common video encoders.

In this block, the terminal X respectively determines the number of important video encoders in use and the number of common video encoders in use.

At block 12, the terminal X respectively determines, according to a processing capability of the terminal X and a newest determined result, an encoding parameter for the important video and an encoding parameter for the common video, and informs each important video encoder in use and each common video encoder in use to perform video encoding according to the determined encoding parameters.

Since the focus degree of the important video is higher than that of the common video, different encoding parameters may be adopted for the important video and the common video. The encoding parameter mainly includes a highest encoding frame rate. Certainly, in a practical application, the encoding parameter may include other parameters, which may be determined according to a practical requirement.

The highest encoding frame rate of the important video may be increased to some extent, such that limited computing resources are concentrated on the important video having high focus degree. Thus, the important video may have a better quality and the experience of the user is improved.

However, with the increase of the resolution of the important video, i.e., with the increase of the highest encoding frame rate of the important video, consumption of computing resources of the terminal increases dramatically. Therefore, while increasing the highest encoding frame rate of the important video, it is also required to control the consumption of the computing resources within a processing capability of the terminal.

According to the above video encoding method in multi-party video communication, for each terminal participates in the multi-party video communication, it is possible to determine an encoding parameter for an important video and an encoding parameter for a common video according to its processing capability and number of important video encoders in use and the number of common video encoders in use. The computing resource of the terminal may be utilized more reasonably and the video communication quality is improved.

Figure 2:
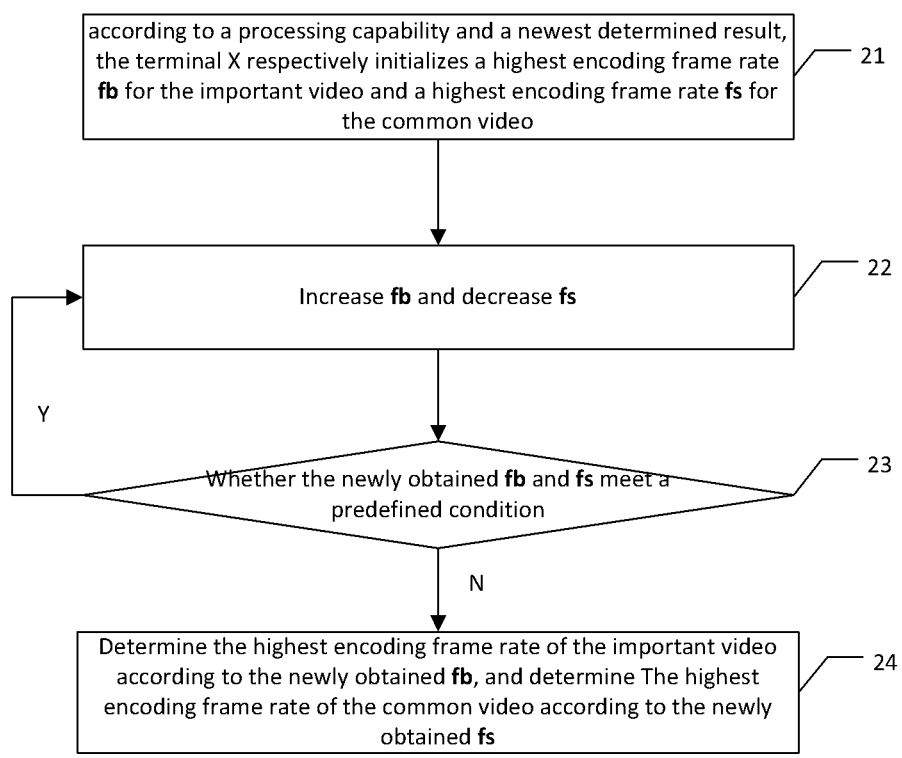
FIG. 2 is a schematic diagram illustrating the determination of the highest encoding frame rate of the important video and the highest encoding frame rate of the common video of the terminal X according to an example of the present disclosure.

FIG. 2 is a schematic diagram illustrating a process of determining a highest encoding frame rate for an important video and determining a highest encoding frame rate for a common video by the terminal X according to an example of the present disclosure. As shown in FIG. 2, the method includes the following.

At block 21, according to a processing capability and a newest determined result, the terminal X respectively initializes a highest encoding frame rate $f_b$ for the important video and a highest encoding frame rate $f_s$ for the common video.

$$f_b = f_s = F/(m + n \cdot r); \quad (1)$$

wherein m denotes the number of common video encoders newly determined;

n denotes the number of important video encoders newly determined;

r denotes a proportion factor of computing resource consumed by an important video with a resolution of $w_b \times h_b$ to computing resources consumed by a common video with a resolution of $w_s \times h_s$, it may be calculated according to a proportion of the resolutions in simplification:

$$r = w_b \times h_b / (w_s \times h_s); \quad (2)$$

or, it is also possible to obtain, through an experiment, a proportion of an encoding rate of the important video with a resolution of $w_b \times h_b$ to the encoding rate of the common video with a resolution of $w_s \times h_s$, and take the encoding rate proportion as r, wherein the experiment is performed on the terminal X;

F denotes the processing capability of the terminal X, expressed by a highest encoding frame rate available for encoding a video with a resolution of $w_s \times h_s$, it may be calculated according to a following formula:

$$F = fps_{enc} \cdot w_{usage}; \quad (3)$$

wherein, $fps_{enc}$ denotes an encoding speed (expressed by an average number of frames encoded in each second) for encoding a video with a resolution of $w_s \times h_s$ by the terminal X with full load. It is possible to obtain the $fps_{enc}$ corresponding to processors of different main frequencies via an experimental measurement and store the $fps_{enc}$ in a table; wherein $w_{usage}$ denotes a desired usage ratio of the encoding operation to the processor of the terminal X. The detailed value of the $w_{usage}$ may be determined according to a practical requirement. It may be inputted and configured by the user and may be adjusted. For example, when the terminal X is sufficiently charged, it is possible to configure $w_{usage}$=60%. If the terminal X has low battery or the user desires to save power, it is possible to configure $w_{usage}$=20%.

At block 22, $f_b$ is increased and $f_s$ is decreased.

In this block, the highest encoding frame rate of the important video is increased and the highest encoding frame rate of the common video is decreased. For example, let $f_b = f_b + \Delta f$, $f_s = f_s - \Delta f$, $\Delta f > 0$. The value of $\Delta f$ may be determined according to a practical requirement, e.g., 1.

At block 23, it is determined whether $f_b$ and $f_s$ newly obtained in block 22 meet a predefined condition, if yes, block 22 is repeated; otherwise, block 24 is performed.

If the newly obtained $f_b$ and $f_s$, i.e., $f_b$ and $f_s$ obtained in block 22 meet following conditions (a) and (b) at the same time, block 22 is repeated; otherwise, block 24 is performed.

Condition (a)

An absolute value of a difference between a mean opinion score (MOS) of the important video and an MOS of the common video is smaller than a predefined threshold $\Delta MOS_{Theshold}$.

$\Delta MOS_{Theshold}$ may be determined according to a practical requirement, e.g., 0.5.

MOS is a subjective measurement of the quality of a video. It may be obtained by calculating an average value of subjective scores of different observers, generally reflected by 5-point scale.

The MOS of the important video may be determined according to the newly obtained $f_b$, and the MOS of the common video may be determined according to the newly obtained $f_s$.

In this example, the MOS may be calculated according to a following formula:

$$MOS_{fps}(f) = 5 - \alpha \cdot [\log(f_{max}) - \log(f)]^\beta; \quad (4)$$

or, $$MOS_{fps}(f) = 5 - \ln(f_{max}/f); \quad (5)$$

wherein $\alpha$ and $\beta$ are calculating factors;

$f_{max}$ denotes the highest encoding frame rate possibly used in the video communication.

In a practical application, the MOS corresponding each encoding frame rate may be used in the video communication may be calculated according to formula (4) or (5) and are stored in form of a table. When required, the MOS corresponding to the newly obtained $f_b$ and $f_s$ may be obtained through searching the table.

Generally, let $\alpha=2$, $\beta=1.4$, $f_{max}=30$, $f=1, 2, 3, \ldots, 30$. Then, the table calculated according to the formula (4) includes the following contents: (1, 1.5469), (2, 2.4902), (3, 3), (4, 3.3409), (5, 3.5923), (6, 3.7886), (7, 3.9479), (8, 4.0805), (9, 4.1932), (10, 4.2902), (11, 4.3749), (12, 4.4495), (13, 4.5156), (14, 4.5746), (15, 4.6275), (16, 4.6752), (17, 4.7182), (18, 4.7571), (19, 4.7923), (20, 4.8242), (21, 4.8531), (22, 4.8792), (23, 4.9027), (24, 4.9238), (25, 4.9426), (26, 4.9591), (27, 4.9734), (28, 4.9853), (29, 4.9946), (30, 5). The former element in the parentheses denotes the encoding frame rate, i.e., f, the latter element in the parentheses denotes the corresponding MOS.

Suppose that the newly obtained $f_b$ is 10. Thus, it is obtained through searching the table that the MOS of the important video is 4.292. Suppose that the newly obtained $f_s$ is 8. Thus, it is obtained through searching the table that the MOS of the common video is 4.0805.

Or, the MOS corresponding to the newly obtained $f_b$ and $f_s$ may be calculated directly according to the formula (4) or (5), instead of searching the table.

Condition (b)

A total computing resource consumption of all videos does not exceed the processing capability F of the terminal X, i.e., $$m \cdot f_s + n \cdot f_b \leq F, 1 \leq f_b, f_s \leq f_{max}. \quad (6)$$

At block 24, the highest encoding frame rate of the important video is determined according to the newly obtained $f_b$, and the highest encoding frame rate of the common video is obtained according to the newly obtained $f_s$, i.e., the newly obtained $f_b - \Delta f$ is taken as the highest encoding frame rate of the important video, the newly obtained $f_s + \Delta f$ is taken as the highest encoding frame rate of the common video.

An example is given to describe the foregoing blocks 21 to 24.

Suppose that the initialized $f_b = f_s = 15$.

Then, let $f_b = 16$, $f_s = 14$.

It is determined whether the predefined condition is met when $f_b = 16$ and $f = 14$. If yes, let $f_b = 17$ and $f_s = 13$. It is determined whether the predefined condition is met when $f_b = 17$ and $f_s = 13$. If the condition is not met, 16 is taken as the highest encoding frame rate of the important video, and 14 is taken as the highest encoding frame rate of the common video.

After the processing of blocks 21-24, while the highest encoding frame rate of the important video is increased to have a higher quality, the subjective quality difference between the important video and the common video is restricted within a reasonable range. The computing resource consumption is also controlled within the processing capability of the terminal.

Furthermore, based on the above video encoding method in multi-party video communication, a following block may be further included: if the terminal X determines that at least one of the number of the important video encoders in use and the number of the common video encoders changes, blocks 11 and 12 are executed again.

The change of at least one of the number of the important video encoders in use and the number of the common video encoders may include the following situations: a total number of terminals participate in the video communication increases or decreases (i.e., at least one terminal joins in or quits), or the total number of terminals is not change but a switch happens which switches an important video to a common video or vice versa (e.g., a remote terminal switches the video generated by terminal X from an important video to a common video), or a combination of the above situations.

In this example, encoding parameters may be determined and adjusted effectively according to the change of the number of the important video encoders and the number of the common video encoders, which further improves the video communication quality.

The method ends after the terminal X closes.

It should be noted that, the above formulas may have many variations or modifications, if only the corresponding objective can be achieved.

Now, the method provided by the example of the present disclosure has been described.

Figure 3:
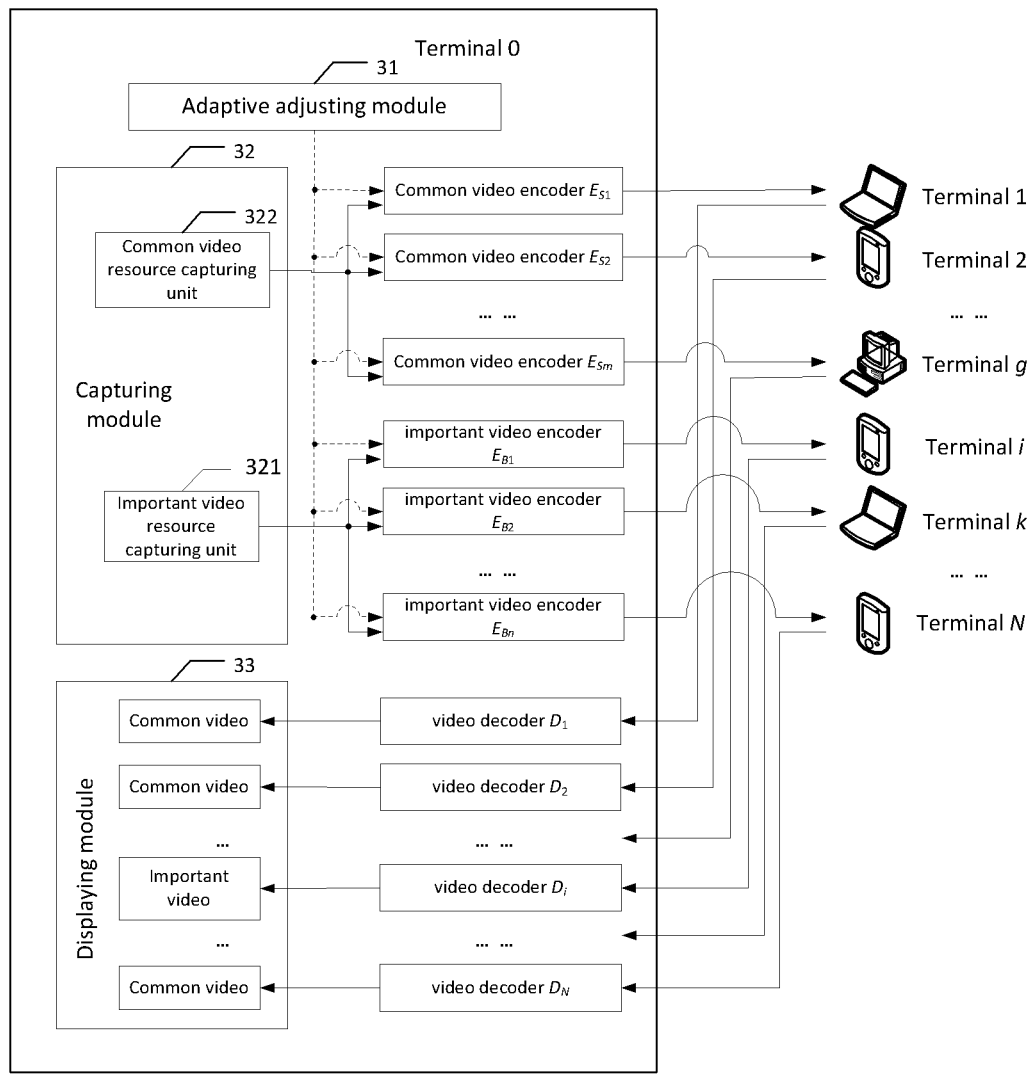
FIG. 3 is a schematic diagram illustrating a structure of a terminal according to an example of the present disclosure.

Based on the above description, FIG. 3 is a schematic diagram illustrating a structure of a terminal according to an example of the present disclosure. As shown in FIG. 3, the terminal includes: one or more important video encoders (see EB1~EBn in FIG. 3), one or more common video encoders (see Es1~Esm in FIG. 3), and an adaptive adjusting module 31.

The adaptive adjusting module 31 is adapted to determine, after the terminal joins in a multi-party video communication, the number of important video encoders in use and the number of common video encoders in use.

The adaptive adjusting module 31 is further adapted to determine, according to a processing capability of the terminal and a newest determined result, an encoding parameter for an important video and an encoding parameter for a common video, and inform each important video encoder in use and each common video encoder in use to respectively perform video encoding according to the newly determined encoding parameters.

According to the client provided by the example of the present disclosure, it is possible to determine an encoding parameter for an important video and an encoding parameter for a common video according to its processing capability and number of important video encoders in use and the number of common video encoders in use. The computing resource of the terminal may be utilized more reasonably and the video communication quality is improved.

Furthermore, based on the above terminal example, the adaptive adjusting module may further re-execute when at least one of the number of the important video encoders in use and the number of the common video encoders changes.

Therefore, when at least one of the number of the important video encoders in use and the number of the common video encoders changes, e.g., a total number of terminals participate in the video communication increases or decreases, or the total number of terminals is not change but a switch happens which switches an important video to a common video or vice versa, which results in the change of the number of the important video encoders and the number of the common video encoders, it is possible to re-determine the encoding parameters of the important video and the common video. Thus, the overall video communication quality is further improved.

The encoding parameter includes a highest encoding frame rate.

The adaptive adjusting module 31 may specifically include (not shown in FIG. 3):

a first processing unit, adapted to
respectively determine the number of important video encoders in use and the number of common video encoders in use, and
transmit the determined result to a second processing unit;

the second processing unit, adapted to
determine a highest encoding frame rate $f_b$ for an important video and a highest encoding frame rate $f_s$ for a common video according to a processing capability of the terminal and the determined result, and
transmit the determined $f_b$ and $f_s$ to a third processing unit;

the third processing unit, adapted to
increase $f_b$ and decrease $f_s$,
determine whether the newly obtained $f_b$ and $f_s$ meet a predefined condition,
increase the newly obtained $f_b$ and decrease the newly obtained $f_s$ if the newly obtained $f_b$ and $f_s$ meet the predefined condition,
determine, if the newly obtained $f_b$ and $f_s$ does not meet the predefined condition, a highest encoding frame rate of the important video according to $f_b$ and determine a highest encoding frame rate of the common video according to $f_s$, and
inform each important video encoder in use and each common video encoder in use to perform video encoding according to the determined $f_b$ and $f_s$; and a fourth processing unit, adapted to
trigger the operation of the first processing unit if at least one of the number of the important video encoders in use and the number of common video encoders in use changes.

The second processing unit may further include:

a first processing sub-unit, adapted to calculate $f_b=f_s=F/(m+n\cdot r)$;

wherein m denotes the number of common video encoders newly determined;

n denotes the number of important video encoders newly determined;

r denotes a proportion factor of computing resource consumed by an important video with a resolution of $w_b \times h_b$ to computing resources consumed by a common video with a resolution of $w_s \times h_s$, $r=w_b \times h_b/(w_s \times h_s)$; or, it is also possible to obtain, through an experiment, a proportion of an encoding rate of the important video with a resolution of $w_b \times h_b$ to the encoding rate of the common video with a resolution of $w_s \times h_s$, and take the encoding rate proportion as r;

F denotes the processing capability of the terminal X, $F=fps_{enc} \cdot w_{usage}$; wherein, $fps_{enc}$ denotes an encoding speed for encoding a video with a resolution of $w_s \times h_s$ by the terminal X with full load; $w_{usage}$ denotes a desired usage ratio of the encoding operation to the processor of the terminal X;

a second processing sub-unit, adapted to transmit the calculated $f_b$ and $f_s$ to the third processing unit.

The third processing unit may further include:

a third processing sub-unit, adapted to calculate $f_b=f_b+\Delta f$, $f_s=f_s-\Delta f$, $\Delta f>0$, and transmit a calculated result to a fourth processing sub-unit;

the fourth processing sub-unit, adapted to
determine an MOS of the important video according to the newly obtained $f_b$, and determine an MOS of the common video according to the newly obtained $f_s$;
determine, if an absolute value of a difference between a mean opinion score (MOS) of the important video and an MOS of the common video is smaller than a predefined threshold $\Delta MOS_{Theshold}$ and $m \cdot f_s + n \cdot f_b \leq F$, $1 \leq f_b$, $f_s \leq f_{max}$, $f_{max}$ denotes the highest encoding frame rate possibly used in the video communication, that the newly obtained $f_b$ and $f_s$ meet the predefined condition, and inform the third processing sub-unit to re-execute its operation;
determine, if otherwise, the newly obtained $f_b - \Delta f$ is taken as the highest encoding frame rate of the important video, determine the newly obtained $f_s + \Delta f$ as the highest encoding frame rate of the common video, and inform each important video encoder in use and each common video encoder in use to perform video encoding according to the determined encoding parameters.

The fourth processing sub-unit may respectively calculate the MOS corresponding each encoding frame rate may be used in the video communication according to a predefined formula and store the calculated MOS in form of a table. When required, the MOS corresponding to the newly obtained $f_b$ and $f_s$ may be obtained through searching the table.

Alternatively, the fourth processing sub-unit may also calculate the MOS corresponding to the newly obtained $f_b$ and $f_s$ directly according to the predefined formula.

The predefined formula may be as follows: $MOS_{fps}(f)=5-\alpha \cdot [\log(f_{max})-\log(f)]^\beta$; or, $MOS_{fps}(f)=5-\ln(f_{max}/f)$; wherein $\alpha$ and $\beta$ are calculating factors.

In a practical application, besides the above units, the terminal shown in FIG. 3 may further include some other components, e.g., a capturing module 32, a video decoder (see D1~DN in FIG. 3), and a displaying module 33.

The capturing module 32 may further include an important video source capturing unit 321 and a common video source capturing unit 322. The important video source capturing unit 321 transmits captured video data to each important video encoder in use. The common video source capturing unit 322 transmits captured video data to each common video encoder in use. The videos captured by the important video source capturing unit 321 and the common video source capturing unit 322 have the same contents, but with different resolutions.

Generally, with respect to each remote terminal, it is required to use a video decoder. However, code streams generated by one video encoder may be transmitted to one or more remote terminals. Suppose that the terminal (terminal 0) as shown in FIG. 3 respectively use one video encoder and one video decoder with respect to each remote terminal, i.e., terminals 1~N. Thus, terminal 0 needs to use N video encoders and N video decoders.

The displaying module 33 displays the important video and the common video obtained by each video decoder.

Detailed operations and functions of the terminal shown in FIG. 3 may be seen from the descriptions of the foregoing method example of the present disclosure, and are not repeated herein.

Those with ordinary skill in the art would know that all or some of the blocks of the present disclosure may be implemented by hardware, or implemented by a program executed on a relevant hardware. The program may be stored on a computer readable storage medium, such as a read only memory (ROM)/random access memory (RAM), disk or compact disk, etc.

What has been described and illustrated herein is a preferred example of the disclosure along with some of its variations. Many variations are possible within the scope of the disclosure, which is intended to be defined by the following claims—and their equivalents—in which all terms are meant in their broadest reasonable sense unless otherwise indicated.

The invention claimed is:

1. A method for video encoding in a multi-party video communication, comprising:
   after a terminal X joins in a multi-party video communication,
   A, respectively determining a number of important video encoders in use and a number of common video encoders in use of the terminal;
   B, according to a processing capability of the terminal and a newest determining result, respectively determining an encoding parameter for an important video and an encoding parameter for a common video, and informing each important video encoder in use and each common video encoder in use to perform video encoding according to the newly determined encoding parameters,
   wherein the encoding parameter comprises a highest encoding frame rate,
   and wherein determining the encoding parameter for the important video and the encoding parameter for the common video comprises:
   b1, according to the processing capability of the terminal and the determined number of the important video encoders and the number of the common video encoders, respectively initializing a highest encoding frame rate $f_b$ of the important video and a highest encoding frame rate $f_s$ of the common video;
   b2, increasing $f_b$ and decreasing $f_s$, and determining a mean opinion score (MOS) of the important video according to the newly obtained $f_b$, and determining an MOS of the common video according to the newly obtained $f_s$; determining whether a difference between the MOS of the important video and the MOS of the common video meets a predefined condition, if the difference between the MOS of the important video and the MOS of the common video meets the predefined condition, repeating step b2, otherwise, determining the highest encoding frame rate of the important video according to the newly obtained $f_b$, and determining the highest encoding frame rate of the common video according to the newly obtained $f_s$.

2. The method of claim 1, wherein
   the increasing $f_b$ and decreasing $f_s$ comprises: letting $f_b=f_b+\Delta f$, $f_s=f_s-\Delta f$, $\Delta f>0$;
   the determining the highest encoding frame rate of the important video according to the newly obtained $f_b$ and determining the highest encoding frame rate of the common video according to the newly obtained $f_s$ comprises:
   taking the newly obtained $f_b-\Delta f$ as the highest encoding frame rate of the important video, and taking the newly obtained $f_s+\Delta f$ as the highest encoding frame rate of the common video.

3. The method of claim 1, wherein respectively initializing the highest encoding frame rate $f_b$ of the important video and the highest encoding frame rate $f_s$ of the common video comprises:

calculating $f_b=f_s=F/(m+n \cdot r)$ wherein m denotes the number of common video encoders newly determined;
   n denotes the number of important video encoders newly determined;
   r denotes a proportion factor of computing resource consumed by an important video with a resolution of $w_b \times h_b$ to computing resources consumed by a common video with a resolution of $w_s \times h_s$, $r=w_b \times h_b/(w_s \times h_s)$; or, r denotes a proportion, obtained through an experiment, of an encoding rate of the important video with a resolution of $w_b \times h_b$ to the encoding rate of the common video with a resolution of $w_s \times h_s$;
   F denotes the processing capability of the terminal X, $F=fps_{enc} \cdot w_{usage}$; wherein, $fps_{enc}$ denotes an encoding speed for encoding a video with a resolution of $w_s \times h_s$ by the terminal X with full load; $w_{usage}$ denotes a desired usage ratio of the encoding operation to the processor of the terminal X.

4. The method of claim 3, further comprising:
   respectively obtaining $fps_{enc}$ corresponding to processors with different main frequencies according to an experimental measurement, and storing the $fps_{enc}$ in form of a table; and obtaining the $fps_{enc}$ corresponding to the main frequency of the terminal X through searching the table.

5. The method of claim 3, wherein the determining whether the difference between the MOS of the important video and the MOS of the common video meets the predefined condition comprises:

if the difference between the MOS of the important video and the MOS of the common video is smaller than a predetermined threshold $\Delta MOS_{Theshold}$, and $m \cdot f_s + n \cdot f_b \cdot r \leq F$, $1 \leq f_b$, $f_s \leq f_{max}$, determining that the difference between the MOS of the important video and the MOS of the common video meets the predefined condition, wherein $f_{max}$ denotes the highest encoding frame rate available in the video communication.

6. The method of claim 5, wherein the determining the MOS of the important video according to the newly obtained $f_b$, and determining an MOS of the common video according to the newly obtained $f_s$ comprises:

determining MOSs corresponding to encoding frame rates possibly used in the video communication according to a predefined formula, and storing the MOSs in form of a table, obtaining the MOSs respectively corresponding to the newly obtained $f_b$ and $f_s$ through searching the table; or determining the MOSs respectively corresponding to the newly obtained $f_b$ and $f_s$ through calculating according to a predefined formula.

7. The method of claim 6, wherein the predefined formula comprises any one of:

$$MOS_{fps}(f)=5-\alpha \cdot [\log(f_{max})-\log(f)]^\beta, MOS_{fps}(f)=5-\ln(f_{max}/f);$$

wherein $\alpha$ and $\beta$ are calculating factors.

8. The method of claim 1, wherein if at least one of the number of the important video encoders in use and the number of the common video encoders in use changes, repeating steps A and B.

9. A terminal, comprising: one or more important video encoders, one or more common video encoders, and an adaptive adjusting module;

the adaptive adjusting module is adapted to:

determine, after the terminal joins in a multi-party video communication, the number of important video encoders in use and the number of common video encoders in use; and determine, according to a processing capability of the terminal and a newest determined result, an encoding parameter for an important video and an encoding parameter for a common video, and inform each important video encoder in use and each common video encoder in use to respectively perform video encoding according to the newly determined encoding parameters, wherein the encoding parameter comprises a highest encoding frame rate, and wherein the adaptive adjusting module further comprises:

a first processing unit, adapted to
respectively determine the number of important video encoders in use and the number of common video encoders in use, and
transmit the determined result to a second processing unit;

the second processing unit, adapted to:
determine a highest encoding frame rate $f_b$ for an important video and a highest encoding frame rate $f_s$ for a common video according to a processing capability of the terminal and the determined number of the important video encoders and the number of the common video encoders, and
transmit the determined $f_b$ and $f_s$ to a third processing unit;

the third processing unit, adapted to:
increase $f_b$ and decrease $f_s$,
determine a mean opinion score (MOS) of the important video according to the newly obtained $f_b$, and determine an MOS of the common video according to the newly obtained $f_s$; determine whether a difference between the MOS of the important video and the MOS of the common video meets a predefined condition,
increase the newly obtained $f_b$ and decrease the newly obtained $f_s$ if the difference between the MOS of the important video and the MOS of the common video meets the predefined condition,
determine, if the difference between the MOS of the important video and the MOS of the common video does not meet the predefined condition, a highest encoding frame rate of the important video according to $f_b$ and determine a highest encoding frame rate of the common video according to $f_s$, and
inform each important video encoder in use and each common video encoder in use to perform video encoding according to the determined $f_b$ and $f_s$; and a fourth processing unit, adapted to:
trigger the operation of the first processing unit if at least one of the number of the important video encoders in use and the number of common video encoders in use changes.

10. The terminal of claim 9, wherein the second processing unit further comprises:

a first processing sub-unit, adapted to calculate $f_b=f_s=F/(m+n \cdot r)$;

wherein m denotes the number of common video encoders newly determined;

n denotes the number of important video encoders newly determined;

r denotes a proportion factor of computing resource consumed by an important video with a resolution of $w_b \times h_b$ to computing resources consumed by a common video with a resolution of $w_s \times h_s$, $r=w_b \times h_b/(w_s \times h_s)$; or, r denotes a proportion, obtained through an experiment, of an encoding rate of the important video with a resolution of $w_b \times h_b$ to the encoding rate of the common video with a resolution of $w_s \times h_s$;

F denotes the processing capability of the terminal X, $F=fps^{enc}_{enc} \cdot w_{usage}$; wherein, $fps^{enc}$ denotes an encoding speed for encoding a video with a resolution of $w_s \times h_s$ by the terminal X with full load; $w_{usage}$ denotes a desired usage ratio of the encoding operation to the processor of the terminal X;

a second processing sub-unit, adapted to transmit the calculated $f_b$ and $f_s$ to the third processing unit.

11. The terminal of claim 10, wherein the third processing unit comprises:

a third processing sub-unit, adapted to calculate $f_b=f_b+\Delta f$, $f_s=f_s-\Delta f$, $\Delta f>0$, and transmit a calculated result to a fourth processing sub-unit;

the fourth processing sub-unit, adapted to:
determine, if an absolute value of the difference between the MOS of the important video and the MOS of the common video is smaller than a predefined threshold $\Delta MOS_{Theshold}$, and $m \cdot f_s+n \cdot f_b \leq F$, $1 \leq f_b$, $f_s \leq f_{max}$, $f_{max}$ denotes the highest encoding frame rate possibly used in the video communication, that the difference between the MOS of the important video and the MOS of the common video meets the predefined condition, and inform the third processing sub-unit to re-execute its operation;

determine, if otherwise, the newly obtained $f_b - \Delta f$ is taken as the highest encoding frame rate of the important video, determine the newly obtained $f_s + \Delta f$ as the highest encoding frame rate of the common video, and inform each important video encoder in use and each common video encoder in use to perform video encoding according to the determined encoding parameters.

12. The terminal of claim 11, wherein the fourth processing sub-unit is further adapted to:

respectively calculate the MOS corresponding each encoding frame rate may be used in the video communication according to a predefined formula and store the calculated MOS in form of a table, and obtain the MOS corresponding to the newly obtained $f_b$ and $f_s$ through searching the table; or calculate the MOS corresponding to the newly obtained $f_b$ and $f_s$ directly according to the predefined formula;

wherein the predefined formula comprises: $MOS_{fps}(f)=5-\alpha \cdot [\log(f_{max})-\log(f)]^\beta$; or, $MOS_{fps}(f)=5-\ln(f_{max}/f)$; wherein $\alpha$ and $\beta$ are calculating factors.

13. The terminal of claim 9, wherein the adaptive adjusting module is further adapted to re-execute its functions when at least one of the number of the important video encoders and the number of the common video encoders change.

14. A non-transitory computer readable storage medium, comprising a set of instructions for video encoding in multi-party video communication, the set of instructions to direct at least one processor to perform the method as claimed in preceding claim 1.

* * * * *